(12) United States Patent
Seo et al.

(10) Patent No.: US 7,474,454 B2
(45) Date of Patent: Jan. 6, 2009

(54) PROGRAMMABLE MICROMIRROR MOTION CONTROL SYSTEM

(75) Inventors: Cheong Soo Seo, Seongnam (KR); Gyoung Il Cho, Seoul (KR)

(73) Assignees: Angstrom, Inc., Seongnam (KR); Stereo Display, Inc., Anaheim, CA (US)

(*) Notice: Subject to any disclaimer, the term of this patent is extended or adjusted under 35 U.S.C. 154(b) by 336 days.

(21) Appl. No.: 11/369,797

(22) Filed: Mar. 6, 2006

(65) Prior Publication Data

US 2006/0152792 A1    Jul. 13, 2006

Related U.S. Application Data

(63) Continuation-in-part of application No. 10/872,241, filed on Jun. 18, 2004, now Pat. No. 7,382,516, and a continuation-in-part of application No. 10/893,039, filed on Jul. 16, 2004, now Pat. No. 7,239,438, and a continuation-in-part of application No. 11/072,597, filed on Mar. 4, 2005, now Pat. No. 7,330,297, and a continuation-in-part of application No. 11/347,590, filed on Feb. 4, 2006.

(51) Int. Cl.
   *G02B 26/00* (2006.01)
   *G02B 26/08* (2006.01)
(52) U.S. Cl. ........................ 359/290; 359/223
(58) Field of Classification Search .............. 359/290
   See application file for complete search history.

(56) References Cited

U.S. PATENT DOCUMENTS

| | | | |
|---|---|---|---|
| 2,002,376 A | 5/1935 | Mannheimer |
| 4,407,567 A | 10/1983 | Michelet |
| 4,566,939 A | 1/1986 | Miller |
| 4,834,512 A | 5/1989 | Austin |
| 5,004,319 A | 4/1991 | Smither |
| 5,083,857 A | 1/1992 | Hornbeck |
| 5,212,555 A | 5/1993 | Stoltz |
| 5,369,433 A | 11/1994 | Baldwin |
| 5,402,407 A | 3/1995 | Eguchi |
| 5,467,121 A | 11/1995 | Allcock |
| 5,612,736 A | 3/1997 | Vogeley |
| 5,696,619 A | 12/1997 | Knipe |
| 5,881,034 A | 3/1999 | Mano |
| 5,897,195 A | 4/1999 | Choate |
| 5,986,811 A | 11/1999 | Wohlstadter |
| 6,025,951 A | 2/2000 | Swart |

(Continued)

FOREIGN PATENT DOCUMENTS

JP    08-043881    2/1996

(Continued)

*Primary Examiner*—Jordan M. Schwartz
*Assistant Examiner*—James C Jones

(57) ABSTRACT

A multi-motion programmable micromirror control method is provided with the multiple supports in a stepper plate to upholding the micromirror structure. The control system has advantages such that multiple motion can be applied to a micromirror and that the micromirror can be controlled in a low driving voltage and that simple motion control is applied by digital controlling and that the degrees of freedom in motion of the micromirror can be chosen by the number of the stepper plate and that only single voltage is needed for driving the micromirror motion. With many advantages, the multi-motion programmable micromirror control system provides a solution to overcome the difficulties in controlling micromirror motion.

43 Claims, 6 Drawing Sheets

U.S. PATENT DOCUMENTS

| | | |
|---|---|---|
| 6,028,689 A | 2/2000 | Michalicek |
| 6,064,423 A | 5/2000 | Geng |
| 6,084,843 A | 7/2000 | Abe |
| 6,104,425 A | 8/2000 | Kanno |
| 6,111,900 A | 8/2000 | Suzudo |
| 6,123,985 A | 9/2000 | Robinson |
| 6,232,936 B1 | 5/2001 | Gove |
| 6,282,213 B1 | 8/2001 | Gutin |
| 6,315,423 B1 | 11/2001 | Yu |
| 6,329,737 B1 | 12/2001 | Jerman |
| 6,498,673 B1 | 12/2002 | Frigo |
| 6,507,366 B1 | 1/2003 | Lee |
| 6,549,730 B1 | 4/2003 | Hamada |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,784,771 B1 | 8/2004 | Fan |
| 6,833,938 B2 | 12/2004 | Nishioka |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,943,950 B2 | 9/2005 | Lee |
| 6,958,777 B1 | 10/2005 | Pine |
| 6,970,284 B1 | 11/2005 | Kim |
| 6,995,909 B1 | 2/2006 | Hayashi et al. |
| 6,999,226 B2 | 2/2006 | Kim et al. |
| 7,023,466 B2 | 4/2006 | Favalora et al. |
| 7,031,046 B2 | 4/2006 | Kim et al. |
| 7,046,447 B2 | 5/2006 | Raber |
| 7,068,416 B2 | 6/2006 | Gim et al. |
| 7,077,523 B2 | 7/2006 | Seo et al. |
| 7,161,729 B2 | 1/2007 | Kim et al. |
| 2002/0018407 A1 | 2/2002 | Komoto |
| 2002/0102102 A1 | 8/2002 | Watanabe |
| 2002/0135673 A1 | 9/2002 | Favalora |
| 2003/0007720 A1* | 1/2003 | Staple et al. .................. 385/18 |
| 2003/0058520 A1 | 3/2003 | Yu |
| 2003/0071125 A1 | 4/2003 | Yoo |
| 2003/0174234 A1 | 9/2003 | Kondo |
| 2003/0184843 A1 | 10/2003 | Moon |
| 2004/0009683 A1 | 1/2004 | Hiraoka |
| 2004/0012460 A1 | 1/2004 | Cho |
| 2004/0021802 A1 | 2/2004 | Yoshino |
| 2004/0052180 A1 | 3/2004 | Hong |
| 2004/0246362 A1 | 12/2004 | Konno |
| 2004/0252958 A1 | 12/2004 | Abu-Ageel |
| 2005/0024736 A1 | 2/2005 | Bakin |
| 2005/0057812 A1 | 3/2005 | Raber |
| 2005/0136663 A1 | 6/2005 | Terence Gan |
| 2005/0174625 A1 | 8/2005 | Huiber |
| 2005/0180019 A1 | 8/2005 | Cho |
| 2005/0212856 A1 | 9/2005 | Temple |
| 2005/0224695 A1 | 10/2005 | Mushika |
| 2005/0225884 A1 | 10/2005 | Gim |
| 2005/0231792 A1 | 10/2005 | Alain |
| 2005/0264870 A1 | 12/2005 | Kim |
| 2006/0012766 A1 | 1/2006 | Klosner |
| 2006/0012852 A1 | 1/2006 | Cho |
| 2006/0028709 A1 | 2/2006 | Cho |
| 2006/0187524 A1 | 8/2006 | Sandstrom |
| 2006/0209439 A1 | 9/2006 | Cho |

FOREIGN PATENT DOCUMENTS

| | | |
|---|---|---|
| JP | 11-069209 | 3/1999 |
| JP | 2002-288873 | 10/2002 |

* cited by examiner

PROGRAMMABLE MICROMIRROR MOTION CONTROL SYSTEM

REFERENCE TO RELATED APPLICATIONS

This application is a continuation-in-part of, and claims priority to U.S. patent application Ser. No. 10/872,241 filed Jun. 18, 2004, U.S. patent application Ser. No. 10/893,039 filed Jul. 16, 2004, U.S. patent application Ser. No. 10/072,597 filed Mar. 4, 2005, and U.S. patent application Ser. No. 11/347,590 filed Feb. 4, 2006, all of which are hereby incorporated by reference.

FIELD OF INVENTION

The present invention relates to micromirror in general and more specifically micromirror control and motion generation.

BACKGROUND OF THE INVENTION

Micromirrors may be used in various optical applications instead of, or in addition to, conventional optoelectronic devices. It is desirable to be able to move the micromirrors by rotation and translation with very fine control.

Since the micro-electro mechanical systems (MEMS) were developed, many applications in MEMS have been developed and used. Micromirror device is the one of the major development in MEMS field. Devices and application using micromirrors are developed and used in various fields such as optical communication and display. As the applications of micromirrors grow rapidly, the demand on controlling micromirror device becomes increases. It is desirable to have the motion control of the micromirror with many degrees of freedom and simple driving method.

A phase-only piston-style micromirror has been used for phase adaptive optics applications and a rotational micromirror has been used to deflect light. Most of these micromirrors have been controlled to have continuous displacements, which are determined at the equilibrium between electrostatic force and elastic force. The analog control is more complex than the digital or discrete control, and is not compatible with known semiconductor electronics technologies such as MOS, CMOS, etc. In addition, the micromirrors with continuous displacement actuated by electrostatic force undergo the classical snap-down phenomenon when the electric force exceeds the elastic force of mechanical structure. The snap-down phenomenon limits the translational and rotational ranges of a micromirror.

The high driving voltage is another disadvantage in controlling the micromirror motion with continuous displacement actuated by electrostatic force. To be compatible with IC components, it is desired that micromirrors are operated at a low voltage which is compatible with the circuit operation or control voltage.

In a prior art micromirror array, such as, for example, the digital micromirror device (DMD) in U.S. Pat. Nos. 4,566,939, 5,083,857, and 6,232,936, each micromirror is actuated by digital control of a voltage. It has large rotation, low driving voltage, and is compatible with known semiconductor electronics technologies. However, it has only one degree of freedom, that is, rotation about a single axis, and it only has two level positions.

Therefore, the demand on the simple control of the micromirror with more degrees of freedom has been increased to use the micromirror. The present invention is intended to provide a method with multiple motions, a plurality of degrees of freedom, low driving voltage, and simple activation. This control system can have one degree of freedom rotational motion, one degree of freedom translational motion, one degree of freedom and one degree of freedom translational motion, two degrees of freedom rotational motion, and two degrees of freedom rotational motion and one degree of freedom translational motion.

SUMMARY OF THE INVENTION

The present invention contrives to solve the disadvantages of the prior art for controlling micromirror motion. The present invention provides an advanced method for discretely controlled micromirror (DCM) system. Method for DCM system is provided in U.S. patent application Ser. No. 10/872,241 filed Jun. 18, 2004, U.S. patent application Ser. No. 10/893,039 filed Jul. 16, 2004, U.S. patent application Ser. No. 10/072,597 filed Mar. 4, 2005, and U.S. patent application Ser. No. 11/347,590 filed Feb. 4, 2006. DCM system has many advantages for controlling micromirrors such as that DCM uses simple driving method, and that single voltage or discretely separated voltages are used for actuating the micromirror structure, and that degree of freedom can be increased by the number of the stepper plates and the number of the supports, and that multiple motions can be embedded in one structure, and so on.

In the present invention, multi-motion programmable micromirror control method is provided. A stepper plate with multiple supports is introduced for generating multiple motions of a micromirror. The stepper plate is inclined by electrostatic force between the electrodes and the stepper plate. When a stepper plate is inclined for a given step toward the selected direction, the support with the pre-programmed position upholds the micromirror to make a desired motion of the micromirror. Each support in a stepper plate gives a pre-programmed micromirror motion with other support or supports in the same step upholding the micromirror together. The desired motions of the micromirror also can be obtained by the positions of the supports under the micromirror not by the positions of the supports on the stepper plate. Also support on the stepper plate and support under the micromirror can be applied to the system altogether. Besides controlling the motion of the micromirror by the support positions, the motion can be selected by different amounts of the rotation angle of the stepper plates for each step. The control system is actuated by the electrostatic force between the stepper plate and the electrodes. Also the electromagnetic and electro-thermal forces can be applied to the system.

The shape of the stepper plates can be varied to have triangular, square, hexagonal, octagonal, circular or other shapes by the number of the supports, number of the steps and the geometries of the micromirror, electrodes, and stepper plates. The number of the steps in a stepper plate can be determined by the shape of the stepper plate, the electrodes under the stepper plates, desired degrees of freedom for making motions and the required number of the motion steps for a micromirror. If the stepper plate has 8 electrodes, the stepper plates can have up to 8 different steps. If the micromirror should have 8 step motions with 3 degrees of freedom, the number of the supports is at least 24 (8 support in each three stepper plate).

Because a stepper plate has multiple motions which can be defined by the positions of the supports, the micromirror can have many steps in a small sized volume. The step density of the motion is much higher than the case of multiple stepper plates with one support. Since the micromirror is small in size, the high density of the motions is strongly desirable for controlling the micromirror.

The control system needs low voltage to control the micromirror due to the multiple electrode usage. Since defining of a step is only determined by the direction of the inclined stepper plate and the support position, one step in a stepper plate can share neighboring electrodes to have stronger electrostatic force as many as the force by the neighboring electrodes does not disturb the required rotation of the stepper plate. By using the multiple electrodes together, the driving voltage can be reduced since the effective area for forming the electrostatic force is increased. Electrostatic force can be increased by doubled or tripled the area of the electrode by applying the driving voltage to the on-step electrode accompanying with neighboring electrodes. By applying the voltage to the multiple electrodes together, the stepper plate with supports can uphold the micromirror with stiffer restoring elastic force or reduce the driving voltage. Each step is controlled by the corresponding electrode or electrodes. Also the plurality of the micromirror can be controlled by the common voltage source.

Another advantage of the present invention is that the stepper plate is digitally controlled and has simple two states for each step. For controlling the full steps of the micromirror motions, the device needs only the same number of the control channels as that of the motion steps to be required by the micromirror. Since the desired motion is already programmed while fabricating the micromirror structure in the stepper and support geometry, simply applying voltage to the desired electrode makes the desired motion active. The present invention gives a simple way to control the micromirror with multiple steps. The programmable micromirror control system can be made on the CMOS structures and the system is controlled by the CMOS circuit.

Still another advantage is that the control system has many degrees of freedom in motion control. The degrees of the freedom are constraint by the number of the stepper plates. The degrees of the freedom can be varied by adding more stepper plate to obtain the desired motion in the micromirror. When the stepper plate is inclined, the support on stepper plate is raised and upholds the micromirror. If the micromirror needs three degrees of freedom motions, three different stepper plates are applied and three supports define the desire motion. The degrees of freedom in motion are constraint by the number of the supports in a step or by the number of the stepper plates. The motion control system can have one rotational degree of freedom, one translational degrees of freedom, one translational and one rotational degrees of freedom, two rotational and one translational degree of freedom, two rotational degrees of freedom and so on. The control system has a plurality of degrees of freedom in motion control.

The multi-motion programmable micromirror control method of the present invention has advantages: (1) multiple motion can be applied to the micromirror; (2) high density motions can be applied to the micromirror; (3) the micromirror can be controlled in a low driving voltage; (4) simple motion control is applied by digital controlling; (5) the degrees of freedom in motion of the micromirror can be chosen by the number of the stepper plate; (6) only single voltage is needed for driving the micromirror motion; and (7) the micromirror is controlled in a stepwise way.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 1:
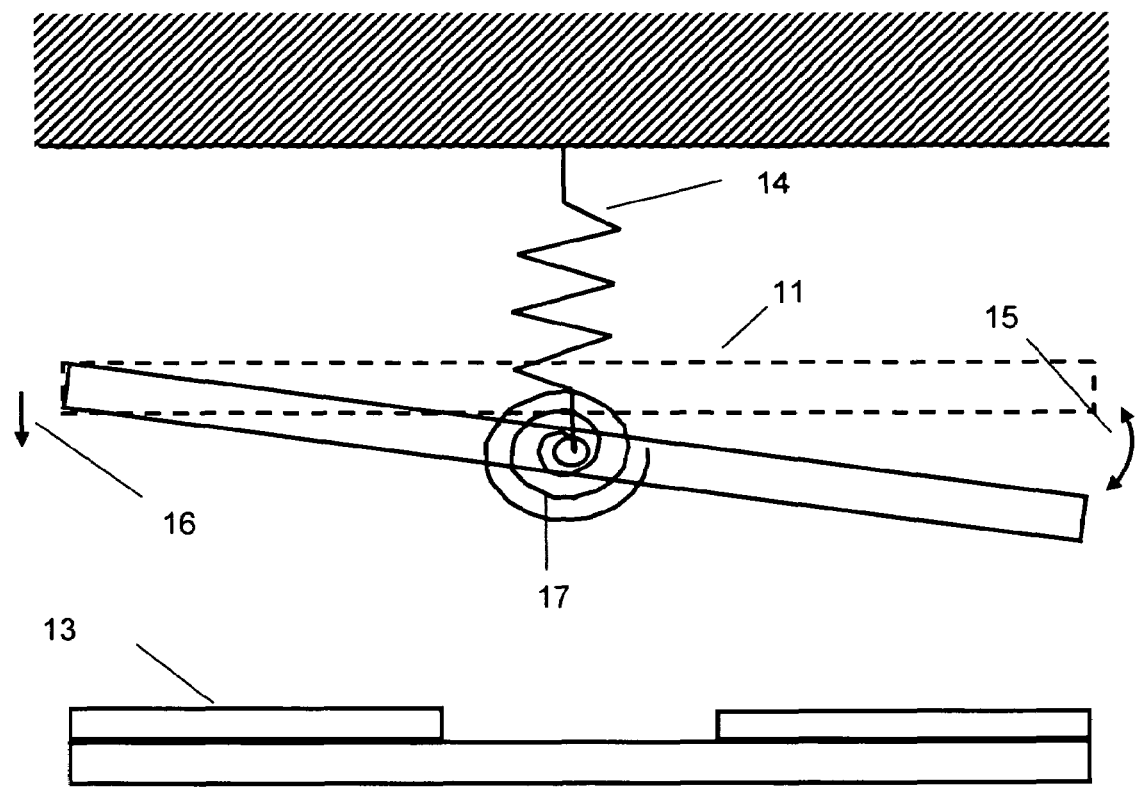
FIG. 1 is a schematic diagram showing how prior art controls the micromirrors.

FIG. 1 shows schematic diagram of the prior art of the micromirror control system. Micromirror 11 is controlled to have a continuous rotation 15 or translation 16, which is determined by the equilibrium between electrostatic force from the electrode 13 and the micromirror 11 structure and elastic force of the translational spring 14 and the rotational spring 17. The micromirror 11 is rotated along the hinge supported by the supporting structure. Since the motion is determined by the static equilibrium of the electrostatic and elastic forces, complex analog control with active feedback is required to have a fine control of the motion.

On the other hand, discretely controlled micromirror (DCM) method has simpler control system. Once the motion is defined and programmed in the micromirror structure, the control is just applying the on/off voltage for desired channel with respect to the desired motion. No feedback is required and the motion is reproducible regardless of the environment.

A multi-motion programmable micromirror control system comprises at least on stepper plate configured to be rotated to uphold micromirror structure, wherein the stepper plate has at least two contact points, wherein the two contact points have different heights to make the stepper plate to have a motion of rotation, a bottom layer configured to have at least one electrodes to control the stepper plate and a micromirror coupled to the stepper plate wherein the micromirror has the multiple motion programmed by the positions of the supports or the rotation angles of the stepper plate.

Figure 2:
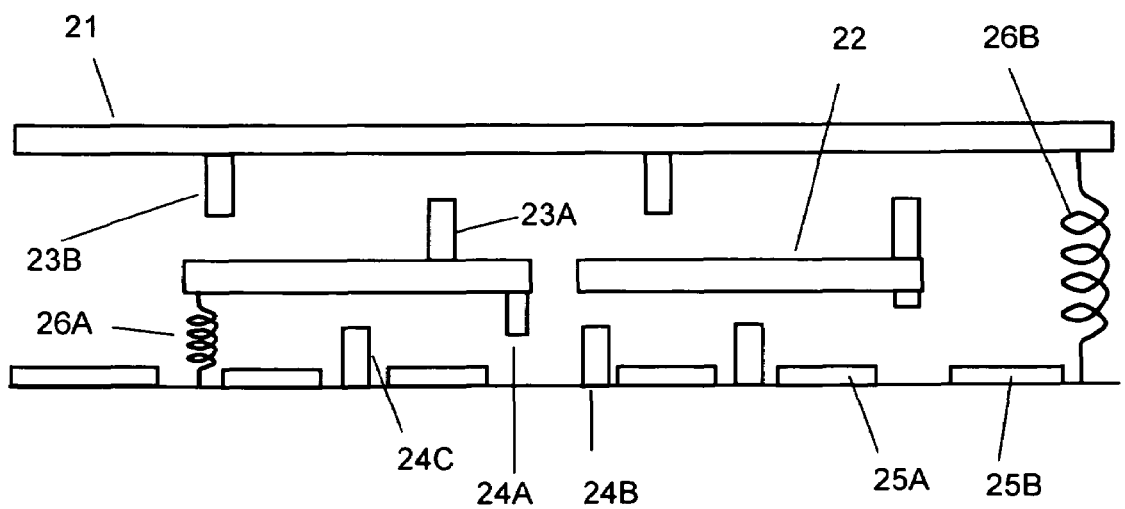
FIG. 2 show schematic diagrams of discretely controlled micromirror control system of embodiment.

FIG. 2 shows a micromirror control system for a discretely controlled micromirror (DCM), according to embodiments of the present invention. The micromirror control system includes stepper plates 22 with multiple supports 23A, 23B, coupled to the bottom layer and configured to be rotated to uphold micromirror structure 21, and a bottom layer configured to have multiple electrodes to control the stepper plate 22, and a micromirror 21 coupled to the stepper plate 22. Also the micromirror control system can use different types of stops 24A, 24B, 24C to control the micromirror motion. The micromirror 21 has the multiple motions programmed by the positions of the supports 23A, 23B or the rotation angles of the stepper plate 22. The micromirror motion is defined by the supports. The micromirror motion is programmed in the geometry of the stepper plate and support while fabricating the control system. The support is positioned on the stepper plate or under the micromirror 21.

The stepper 22 structure is coupled to the bottom layer with electrodes 25A. Each electrode 25A is activated for a given desired motion of the micromirror 21. The supports 23A on the stepper plate are positioned for defining the micromirror motion. When the stepper plate is rotated, the height of the support 23A is varied by in-plane position of the support. The support 23B under the micromirror is also positioned for defining the micromirror motion with the relative positions of the stepper plate 22 and the support 23B under micromirror. The motion of the micromirror 21 is defined by contact position of the supports 23A, 23B after the stepper plate 22 rotated. To have a stable motion of the micromirror, at least three contacting points by support 23A, 23B upholding the micromirror 21 structures are necessary. At the bottom of the stepper plate 22, stops 24A, 24B, 24C make the settling points of the stepper plate 22. The stops 24A, 24B, 24C can be used alone or the combinations of the stops 24A, 24B, 24C can be used. The stops 24A, 24B, 24C under the stepper plate 22 adjust the amount of the angle rotated by its position and/or its height. Also the stop 24B at the bottom layer adjusts the amount of the angle rotated by its position and/or its height. The electrodes 25A pull the stepper plate 22 until the stepper plate rests on the stops 24A, 24B, 24C. The stops with different heights make the stepper plate to be rotated. Then the micromirror is upheld by the support 23A on the stepper plate, or by the stepper plate 22, or the support under the micromirror is upheld by the stepper plates. And the motion of the micromirror 21 is defined by the positions of supports on the stepper plate 23A, or supports under the micromirror 23B, or the rotation angle limited by the stops under the stepper plates 24A, 24B, 24C. The micromirror and the stepper plates are restored due to the restoring forces by the flexible springs 26A, 26B. The micromirror also can be pulled by the micromirror electrode 25B, which makes sure that the micromirror 21 contacts with supports 23A, 23B in a step. The stepper plate has at least on support, wherein the support is coupled to the micromirror or the micromirror has at least one support, wherein the support is coupled to the stepper plate. The support can be positioned on the stepper plates and/or under the micromirror.

Figure 3A:
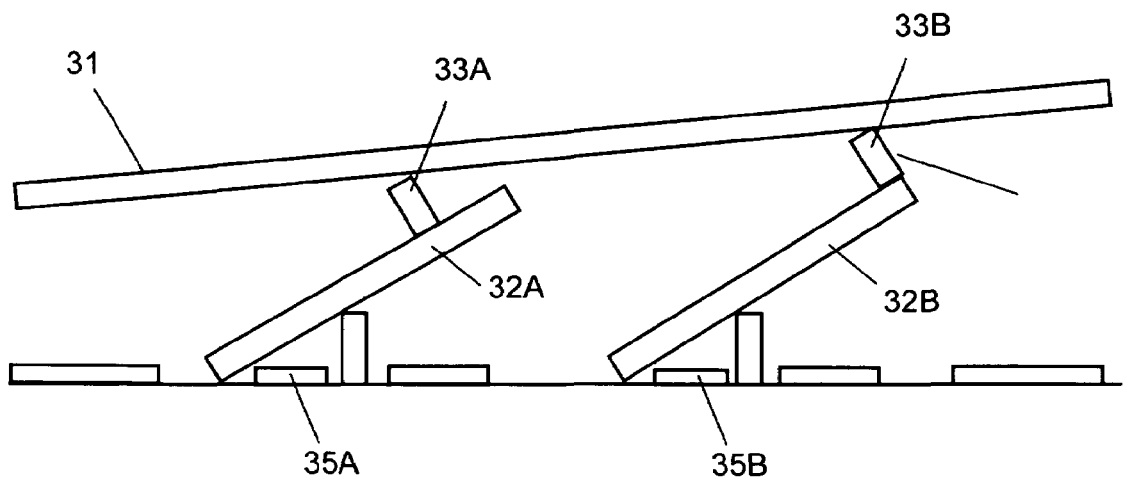
FIGS. 3A-3C show schematic diagrams of discretely controlled micromirror control system when the system has motions.
Figure 3B:
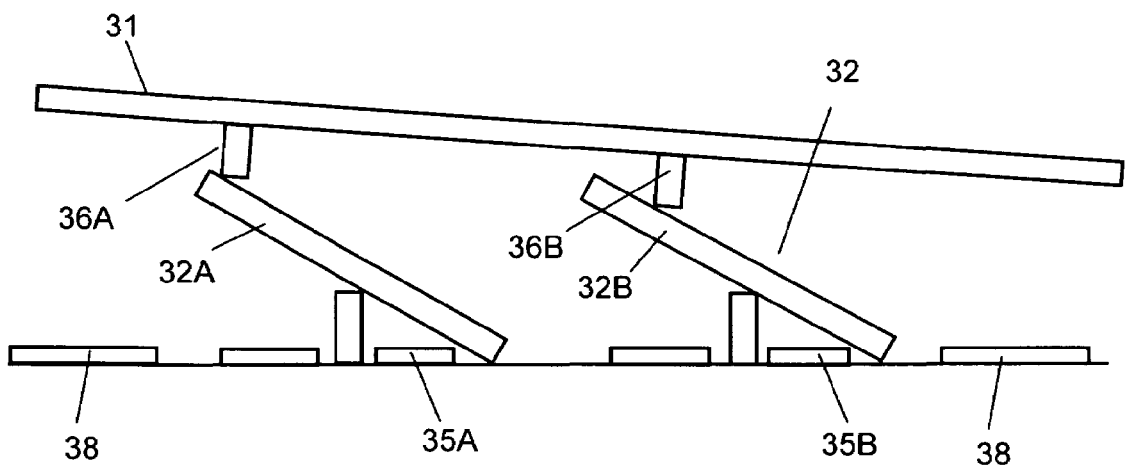
Figure 3C:
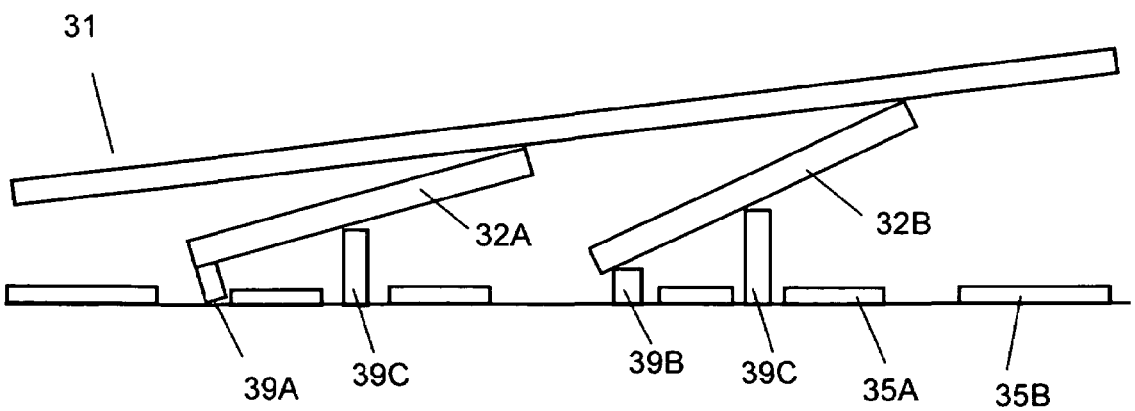

In FIG. 3A, the motion defined by the support 33A, 33B on the stepper plates 32A, 32B are described. The supports 33A, 33B on the stepper plates 32A, 32B push the micromirror 31 to have the desired micromirror motion. The opposite side electrode 35A, 35B are applied by the driving voltage. The motion of the micromirror is defined by the support position on the stepper plate FIG. 3B shows the motion defined by supports 36A, 36B under the micromirror 31. Supports 36A, 36B under the micromirror 31 are upheld by the stepper plates 32A, 32B and the micromirror 31 has motion defined by the contacting positions of the support 36A, 36B under the micromirror and stepper plate. When the driving voltage is applied to the electrodes 35A, 35B, the stepper plates 32A, 32B are inclined by the pre-programmed angle. The rotated stepper plates 32A, 32B push the supports 36A, 36B under the micromirror to the positions where the micromirror motion occurs. The micromirror electrode 38 is used to make the supports to be rested on steppers 32A, 32B. The motion of the micromirror is defined by support position under the micromirror FIG. 3C shows the motion obtained by the stops 39A under the stepper plate 32A. A mechanical stop is applied to the system to determine the amounts of the rotated angle of the stepper plate. In the figure, one stepper plate has the stop 36A under the stepper plate 32A. And the other 32B does not have the stop under the stepper plate 32B. The amounts of the rotation angles are different as the stop position or the height of the stop or even the existence of the stop under the stepper plate. The amount of the rotation of the stepper plate is determined by the stop. Also stop 39B at the bottom layer can define the stepper 32B rotation angle thus the motion of the micromirror 31. While the rotation amount of the stepper is defined, the inside stops 39C plays a role as a contact point to define a plane of the stepper plate 32. And the stepper plate 32 upholds the micromirror. The motion of the micromirror is defined by the rotation amounts of the stepper plate 32 which is determined by the height and/or the position of the stops 34A, 34B, 34C. The motion of the micromirror is defined by the amounts of the rotation of the stepper plate constraint by the position and height of the stops under the stepper plate and/or at the bottom layer. The micromirror has at least one motion programmed by the amount of the rotation of the stepper plate. The stepper plate has at least one stop, wherein the stop is coupled to the bottom layer or the bottom layer has at least one stop, wherein the stop is coupled to the stepper plate. The micromirror has at least one motion programmed by amount of the rotation of the stepper plate and the position of the support. The motion of the micromirror is defined by contact position of the supports on the stepper plate or the support under the micromirror after the stepper plate is rotated. The motion of the micromirror is defined by rotation angle restricted by the stops. The amount of rotation of the stepper plate is determined by the stop and wherein the motion of the micromirror is defined by the mixture of support and stop types. Any combination of supports and stops can be possible even though FIGS. 3A, 3B, and 3C don't show all cases. For example, the motion of the micromirror can be defined by amount of the rotation of the stepper plate and the position of the support or by contact position of the supports on the stepper plate and the support under the micromirror after the stepper plate is rotated.

Figure 4:
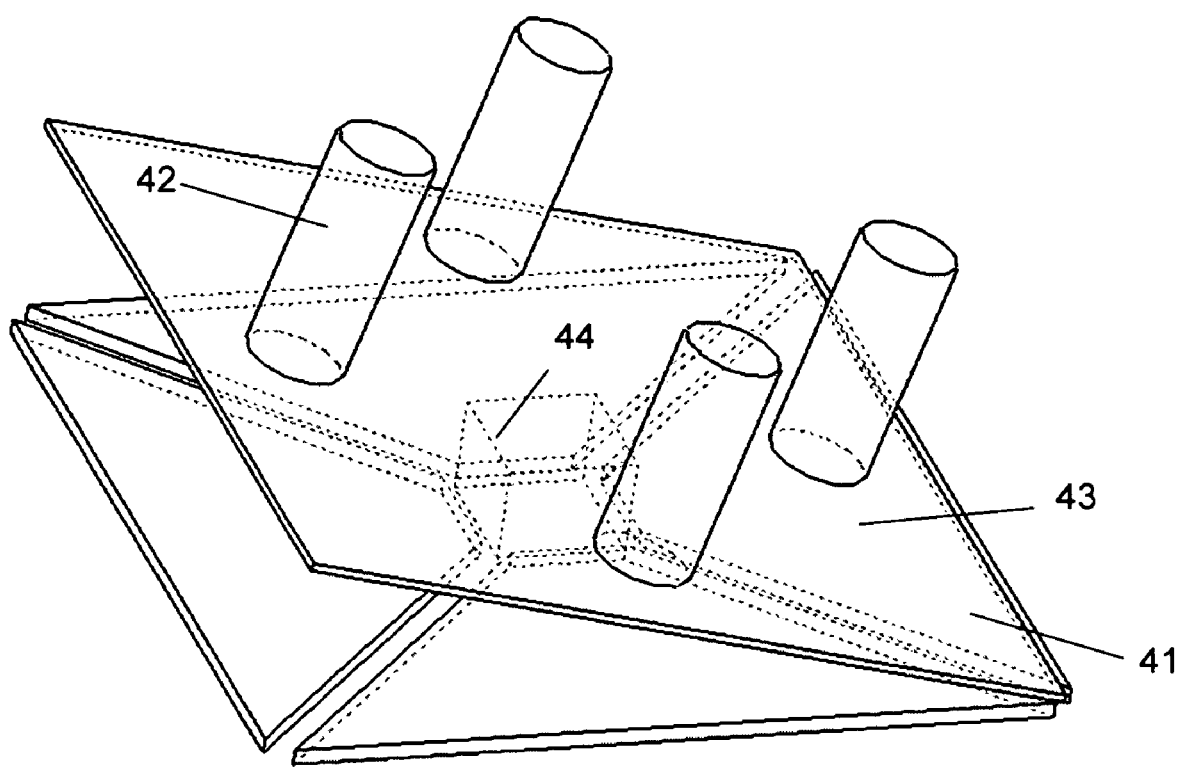
FIG. 4 shows a stepper plate with quadruple supports and electrodes for generating the multiple motions (4 different motions)
Figure 5:
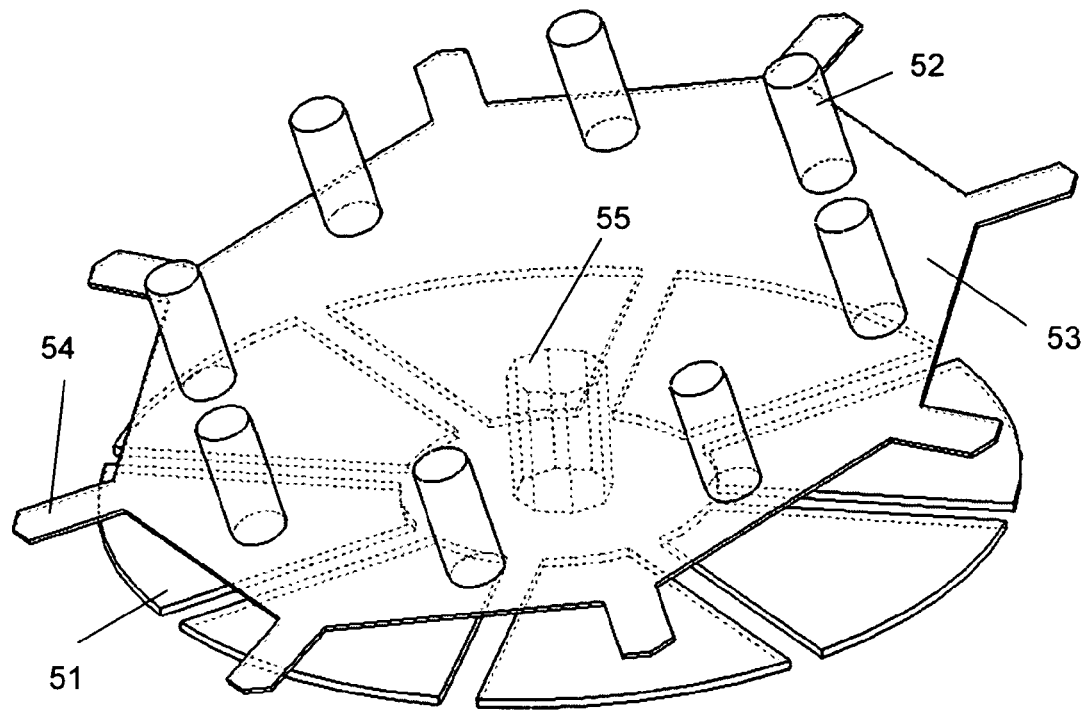
FIG. 5 shows a stepper plate with multiple supports and electrodes for generating the multiple motions (8 different motions)

FIG. 4 shows a stepper plate 43 with quadruple supports 42 on a stepper plate 43 and electrodes 41 for generating four different direction of rotations. The angle amount of the each directional rotation can be same and each motion of the micromirror is controlled by position of support. Also, the angle amount of the each directional rotation can be controlled by using the stop (not shown). The multiple motions of the micromirror are obtained by the supports 42 with respect to the inclination direction of the stepper plate. The micromirror has at least one motion programmed by the position of the support. If the voltage is applied on one of the electrode 41, the stepper plate 43 is inclined and snapped down to the direction of the voltage applied electrode 41. Then the support 42 in opposite side is rotated and raises its tip position by the inclination of the stepper plate 43. The raised support 42 upholds the micromirror to the desired position. Since there are four electrodes, the stepper plate 43 is inclined to the corresponding directions of the electrodes 41. For each inclination direction, the position of the support 42 is determined for generating the desired motion of the micromirror. The position and the height of the support 42 is determined to have the pre-programmed motions and fabricated during making process of the micromirror system. To have larger electrostatic force or lower driving voltage, electric bias can be applied to two or three electrodes at the same time. Since the area of the electrode is doubled or tripled, the electrostatic force becomes larger than that of one electrode case. Each motion of the micromirror can be controlled by using the amount of the each directional rotation and position of support FIG. 5 shows another example of a stepper plate 53 with discretely controlled micromirror method. Eight supports 52 and electrodes 51 for generating eight different heights for generating motions. If the voltage is applied on one of the eight electrodes 51, the stepper plate 52 is inclined and snapped down to the direction of voltage applied electrode 51. Then the support 52 in opposite side is raised by the inclination of the stepper plate 52. The raised support 52 upholds the micromirror to the desired position. Since there are eight electrodes, the stepper plate is inclined to the corresponding directions of the electrodes. For each inclination direction, the position of the support 52 is determined for generating the desired motion of the micromirror. Also, each directional rotation of the stepper plate is controlled by multiple electrodes by sharing electrodes to have larger electrostatic force or lower driving voltage at the same time. Since the area of the electrode 51 is increased, the electrostatic force becomes larger than that of one electrode case. The system has multiple motions which are constraint by the number of the supports in the stepper plates 53. Since the stepper plate contacts the bottom layer structure, the surface forces can cause the stiction problems even though the stepper plate is wholly grounded. To reduce the possible stiction problem, the stepper plate has the tip 54 structure to reduce the contact area of stepper plate. Also the contacting structures have the same potential to prevent stiction problem.

Figure 6:
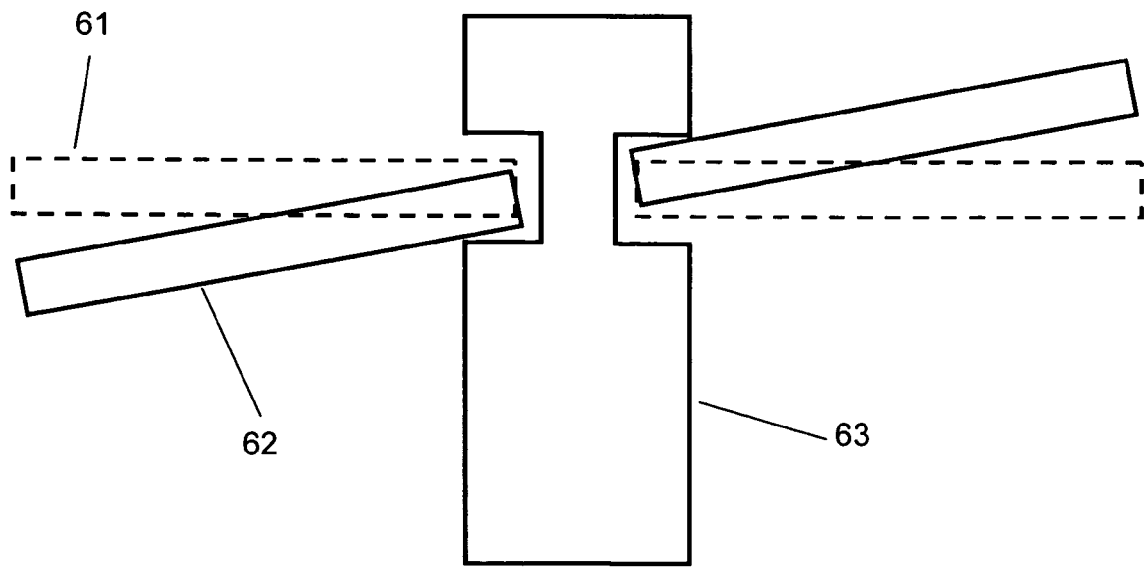
FIG. 6 is a schematic diagram of springless hinge structure.

FIG. 6 is a schematic diagram of springless hinge structure. The stepper plate 61 is attached to a flexible spring, and the flexible spring is attached to a fixed structure in FIG. 2. But the spring can be omitted by using hinge structure as FIG. 6. The stepper plate 62 is confined in the hinge structure 63, while the stepper plate 62 has a motion with inclination.

Figure 7:
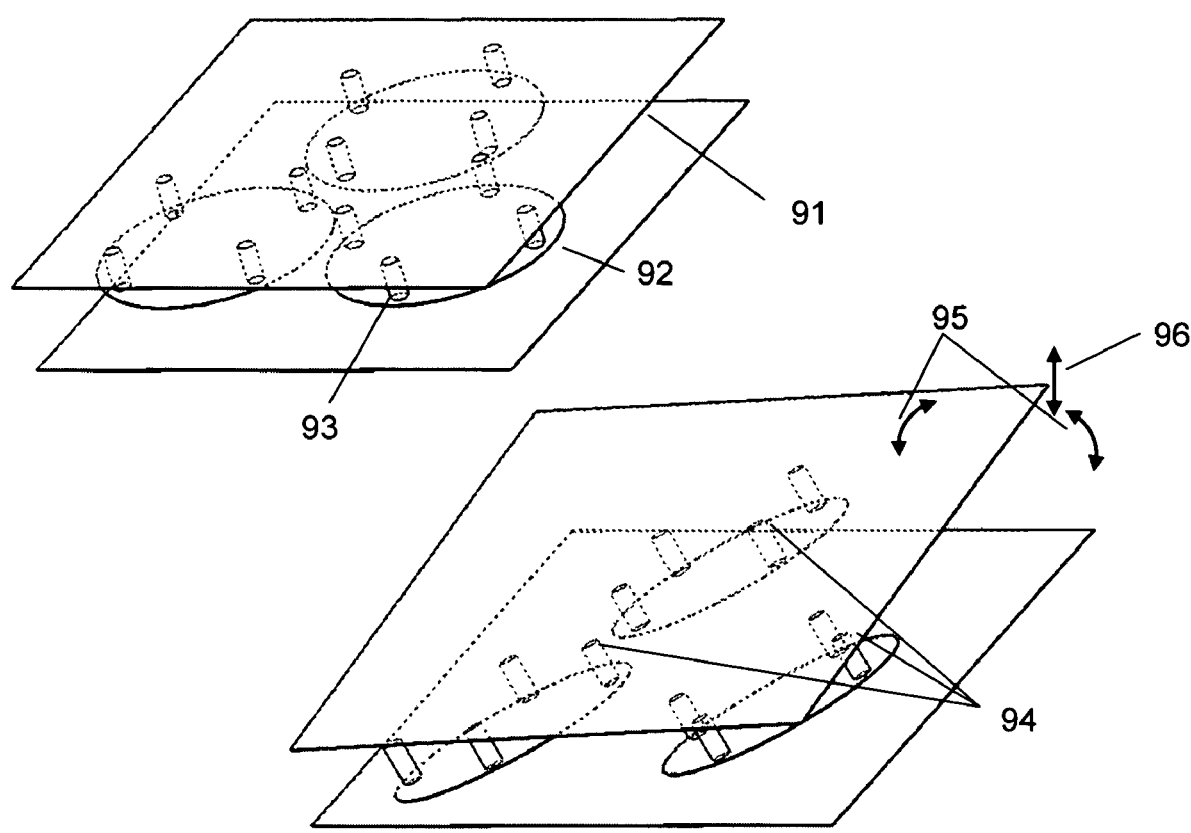
FIG. 7 is a schematic diagram showing how three multiple support actuators define micromirror motions with three degrees of freedom (two rotational and one translational)

In FIG. 7, configuration with three degrees of freedom 95, 96 is presented. The motion has two degrees of freedom rotation 95 and one degree of translation 96. For representing three degrees of freedom motion, at least three supports 94 are needed from different stepper plates 92. In-plane position and/or height of each support 94 from three stepper plates 92 define a specific motion in three dimensional space. These three points by the three supports 94 make a plane for the micromirror 91 representing micromirror motion. Every motion can be specified as a step. In a step, three supports 94 from different stepper plate 92 define a plane of micromirror. In the same way, three other positions by the three other supports define another plane for the micromirror 91. As many planes as the numbers of the supports in a stepper plate 92 can be defined by three stepper plates 92.

Figure 8:
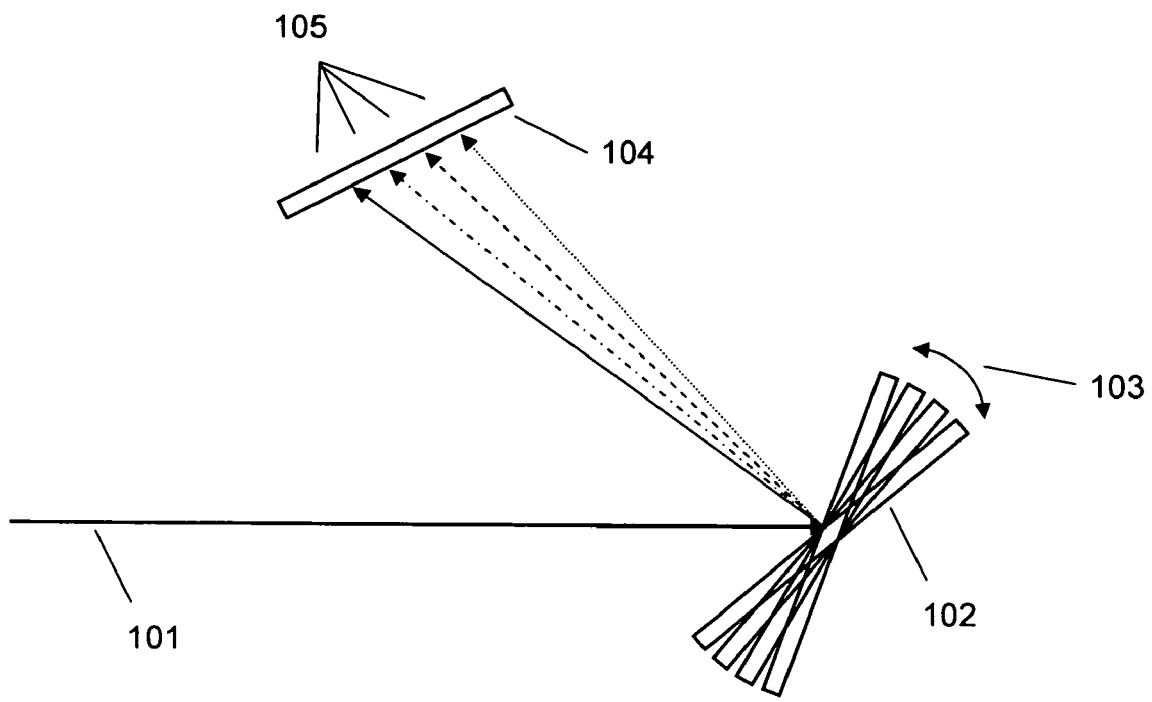
FIG. 8 is a schematic diagram showing how a micromirror with a multiple support actuator works as multi-step optical switch.

An example of light modulation is presented in FIG. 8. The micromirror 102 in the figure has four different motions 103 which are defined by the supports from one or two or three stepper plates. The motions can be controlled by applying voltage to the corresponding electrodes under the stepper plates. Each motion represents the specified micromirror angle 103 for reflecting incident light 101. The micromirror is rotated as the motion is changed and finally changes the path of the reflected light from the micromirror. The reflected light goes to the different positions 105 in the screen 104. By using a micromirror with multiple support stepper plate, a micromirror can act as multi-channel optical switch for deflecting the incident light into multiple directions 105. The multi-channel optical switch deflects the incident light to the desired direction by rotating the micromirror or micromirrors. Since the micromirror motion is not restricted in one dimensional motion, the micromirror can reflect the incident light in a plane with multiple axis change by the rotational motions even with time delay by the translational motion of the micromirror.

Figure 9:
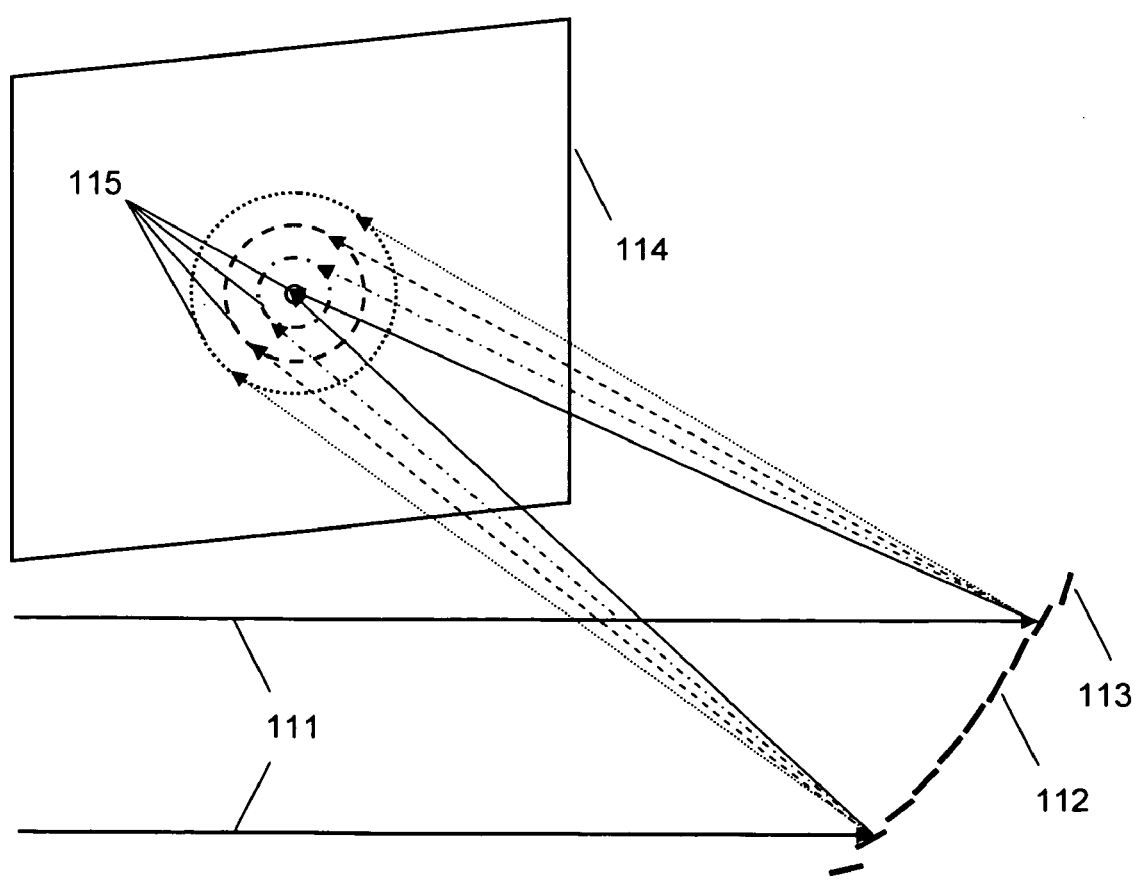
FIG. 9 is a schematic diagram showing how micromirrors with multiple support actuator works as a multi-step micromirror array lens.

In FIG. 9, another example of the spatial light modulation by the micromirror array lens 112. Plurality of micromirrors 112 are controlled by the common voltage electrodes. Micromirror array lens has many micromirrors 113 which are optically coupled to form a lens and controlled to have steps representing various focal lengths. In each step of the motion, each micromirror forms a different focal length lens surface which gives a specified focusing power to the lens. As the figure shows, each step makes the incident beam 111 focused at the screen 114 with the different focal length of the micromirror array lens 112. The focused light pattern 115 by each step of the motion is given in the screen 114. Since the micromirror array lens needs to be controlled to have rotational freedom and translational freedom together, the multi-motion programmable micromirror control is a good solution for having focal length variation. Also the focal length of the micromirror array lens can be programmed during the fabrication process of the micromirrors and the focal length change can be obtained by easily applying the driving voltages on the corresponding electrodes.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A programmable micromirror motion control system comprising:
   a. at least one stepper plate, configured to be rotated to uphold micromirror structure, wherein the stepper plate has at least two contact points with different heights to make the stepper plate to have a motion of rotation
   b. a bottom layer configured to have at least one electrode to control the stepper plate; and
   c. a micromirror;
   wherein the stepper plate has at least three directional rotations and each directional rotation of the stepper plate makes each motion of the micromirror.

2. The programmable micromirror motion control system of claim 1, the stepper is controlled by electrostatic force.

3. The programmable micromirror motion control system of claim 2, the contacting structures have same potential to prevent stiction.

4. The programmable micromirror motion control system of claim 1, the stepper plate has at least one support, wherein the support is coupled to the micromirror or the micromirror has at least one support, wherein the support is coupled to the stepper plate.

5. The programmable micromirror motion control system of claim 1, wherein the micromirror has at least one motion programmed by amount of the rotation of the stepper plate.

6. The programmable micromirror motion control system of claim 5, wherein the amount of the rotation of the stepper plate is determined by the stop.

7. The programmable micromirror control system of claim 1, the stepper plate has at least one stop, wherein the stop is coupled to the bottom layer or the bottom layer has at least one stop, wherein the stop is coupled to the stepper plate.

8. The programmable micromirror motion control system of claim 1, wherein the micromirror has at least one motion programmed by the position of the support.

9. The programmable micromirror motion control system of claim 1, the micromirror has at least one motion programmed by amount of the rotation of the stepper plate and the position of the support.

10. The programmable micromirror motion control system of claim 1, wherein the control system has a plurality of degrees of freedom in motion control.

11. The programmable micromirror motion control system of claim 10, wherein the degrees of the freedom are constraint by the number of the stepper plates.

12. The programmable micromirror motion control system of claim 10, wherein the degrees of freedom in motion are constraint by the number of the supports in a step.

13. The programmable micromirror motion control system of claim 1, wherein the control system has one degree of freedom rotational motion.

14. The programmable micromirror motion control system of claim 1, wherein the control system has one degree of freedom translational motion.

15. The programmable micromirror motion control system of claim 10, wherein the control system has one degree of freedom and one degree of freedom translational motion.

16. The programmable micromirror motion control system of claim 10, wherein the control system has two degrees of freedom rotational motion.

17. The programmable micromirror motion control system of claim 10, wherein the control system has two degrees of freedom rotational motion and one degree of freedom translational motion.

18. The programmable micromirror motion control system of claim 4, wherein the micromirror motion is defined by the supports.

19. The programmable micromirror motion control system of claim 4, wherein the micromirror motion is programmed in the geometry of the stepper plate and support while fabricating the control system.

20. The programmable micromirror motion control system of claim 4, wherein the support is positioned on the stepper plate.

21. The programmable micromirror motion control system of claim 20, wherein the motion of the micromirror is defined by contact position of the supports and the micromirror after the stepper plate is rotated.

22. The programmable micromirror motion control system of claim 4, wherein the support is positioned under the micromirror.

23. The programmable micromirror motion control system of claim 22, wherein the motion of the micromirror is defined by contact position of the supports and the stepper plate after the stepper plate is rotated.

24. The programmable micromirror motion control system of claim 4, wherein the support is positioned both on the stepper plates and under the micromirror.

25. The programmable micromirror motion control system of claim 24, wherein the motion of the micromirror is defined by contact position of the supports on the stepper plate and the support under the micromirror after the stepper plate is rotated.

26. The programmable micromirror motion control system of claim 6, wherein the motion of the micromirror is defined by the amounts of the rotation of the stepper plate constraint by the position and height of the stops under the stepper plate.

27. The programmable micromirror motion control system of claim 6, wherein the motion of the micromirror is defined by the amounts of the rotation of the stepper plate constraint by the position and height of the stops at the bottom layer.

28. The programmable micromirror motion control system of claim 4, wherein the motion of the micromirror is defined by the support position on the stepper plate, or support position under the micromirror 29. The programmable micromirror motion control system of claim 6, wherein the motion of the micromirror is defined by rotation angle of the stepper plate restricted by the stops.

30. The programmable micromirror motion control system of claim 6, wherein the, amount of rotation of the stepper plate is determined by the stop and the motion of the micromirror is defined by the support.

31. The programmable micromirror motion control system of claim 1, wherein the angle amount of the each directional rotation is same and each motion of the micromirror is controlled by position of support.

32. The programmable micromirror motion control system of claim 1, wherein each motion of the micromirror is controlled by the different angle amount of the each directional rotation.

33. The programmable micromirror motion control system of claim 1, wherein each motion of the micromirror is controlled by controlling the amount of the each directional rotation and position of support.

34. The programmable micromirror motion control system of claim 1, wherein each directional rotation of the stepper plate is controlled by the corresponding electrode or electrodes.

35. The programmable micromirror motion control system of claim 1, wherein each directional rotation of the stepper plate is controlled by multiple electrodes by sharing electrodes.

36. The programmable micromirror motion control system of claim 1, wherein the stepper plate has a tip structure to reduce the contact area of stepper plate.

37. The programmable micromirror motion control system of claim 1, wherein the stepper plate has springless hinge structure.

38. The programmable micromirror motion control system of claim 1, wherein the plurality of the micromirrors are controlled by the common voltage source.

39. The programmable micromirror motion control system of claim 1, wherein the micromirror control system is used for a multi-channel optical switch.

40. The programmable micromirror motion control system of claim 39, wherein the multi-channel optical switch deflects the incident light to the desired direction by rotating the micromirror or micromirrors.

41. The programmable micromirror control system of claim 1, wherein a micromirror array lens is controlled by the control system.

42. The programmable micromirror control system of claim 41, wherein the micromirror array lens is controlled to have steps representing various focal lengths.

43. The programmable micromirror control system of claim 1, wherein the programmable micromirror control system is made on the CMOS structures and the system is controlled by the CMOS circuit.

* * * * *